Sept. 13, 1966 R. W. ASTHEIMER 3,272,013
COMBINED RADIOMETER AND EMISSOMETER
Filed Aug. 29, 1963

INVENTOR.
ROBERT W. ASTHEIMER
BY
Robert Ames Norton
ATTORNEY 3,272,013
COMBINED RADIOMETER AND EMISSOMETER
Robert W. Astheimer, Westport, Conn., assignor to Barnes Engineering Company, Stamford, Conn., a corporation of Delaware
Filed Aug. 29, 1963, Ser. No. 305,918
11 Claims. (Cl. 73—355)

This application is in part a continuation of my prior copending application Ser. No. 81,061, filed Jan. 6, 1961, and now abandoned.

This invention relates to constant temperature radiometers and more particularly to such radiometers as are suitable for use in an environment where the ambient temperature differs very markedly from that of the radiometer and may be subject to wide fluctuations.

It is common practice in infrared radiometers to chop the incoming beam in order to produce an A.C. signal from the detector, usually a thermistor bolometer. The chopper periodically permits the detector to see radiation coming into the radiometer from an outside target and a reference source. Sometimes the reference source is a blackened rear surface of the chopper blade itself. This is the simplest, lightest and cheapest construction. The reference source may, of course, be any other black body which is reflected by the rear of the chopper blades onto the detector, and in such cases, of course, the chopper blade rear surfaces are mirrors. If the radiometer is to be used for temperature measurements as a result of radiation coming into the radiometer it is necessary that the reference source and anything else which the detector may see in the radiometer be maintained at a definite fixed temperature because it is the difference in radiation from the source and from the outside target that determines the output signal from the detector.

Often radiometers are used under conditions where the ambient temperature causes no serious problem, but there are certain uses for which the radiometer may have to be maintained at a temperature which is widely different from ambient temperature and the latter may be subject to extensive fluctuations. One such use is a free air thermometer in supersonic airplanes. This is not the only use in which the conditions present a great difference of radiometer temperature and ambient temperature but it is one of the most important uses for the type of radiometer with which the present invention is concerned, and therefore the invention will be described in conjunction with the requirements of the free air thermometer although it should be clearly understood that the invention is in no sense limited to such a use and the radiometers of the invention may be used for any other purpose where the requirements of the measurement functioning of the radiometer present similar problems.

Essentially a free air thermometer receives radiation over a more or less long path in the atmosphere and is provided with selective optics and/or detector such that it responds only to radiation from certain selected components of the atmosphere. In the most practical free-air thermometers carbon dioxide is the component of the atmosphere used through any other gaseous component having suitable infrared radiation characteristics may be employed. The output of the radiometer when amplified and processed in the conventional electronic circuits gives a final output signal which is a function only of the temperature of the atmosphere and is not affected by adjacent radiators such as airplane wings, fuselage and the like which may be at entirely different temperatures than that of the atmosphere. In supersonic planes they will generally be quite a lot hotter. Free-air thermometers as such do not form any part of the present invention, and typical instruments, using selective detectors, are described and claimed in the patent of Rudomanski, De-Waard and Wormser, No. 3,091,693, May 28, 1963.

In some sonic airplanes the temperatures in the compartment where the radiometer of the free air thermometer is locted presents no particular problem. However, in supersonic planes the best place for locating a radiometer of a free-air thermometer will often be in compartments the temperature of which may be fairly high, for example, 100° C. This presents serious problems. It is normally desirable to have a reference temperature for the radiometer either well above or well below anything which may be encountered in the aircraft compartment. For supersonic flight, therefore, it may be necessary to maintain the radiometer reference temperature above 100° C., for example, 125° C. This presents problems in the detector and makes the type of selective detector described in the Rudomanski, DeWaard and Wormser patent, referred to above, unsuitable.

The problem is not completely insoluble and suitable filtering means may be provided so that thermistor bolometers can effectively operate at a temperature well above 100° C. This, however, presents a serious problem for the radiometer itself. If it is to be maintained at a definite fixed high temperature, for example 125° C., so that a simple chopper incorporating its own reference source may be employed the ordinary type of radiometer is not suitable and may in extreme cases not be operable at all for it must be realized that the ambient temperature around the radiometer compartment may vary over wide ranges as the altitude and speed in the plane differs and the external weather conditions change. The ordinary radiometer with large collecting optics has large surfaces exposed to the ambient temperature of a compartment. These act as infrared radiators. Also, the large openings into the radiometer proper permit heat exchange with the radiometer environment and thus permit different temperatures in different parts of the radiometer which can be fatal to accuracy.

The problems are solved by the present invention by using a radiometer design which deliberately flies in the face of accepted radiometer design criteria. Essentially the radiometer of the present invention is one in which the choppers, optics, detectors, and other radiating elements are inside a housing the temperature of which is thermostatically controlled.

Ordinary good radiometer design would dictate collecting optics with a large aperture which would mean large openings into the radiometer and make accurate thermostatic control difficult or impossible. The large aperture and collecting optics are of vital necessity in many radiometers and particularly so in radiometers used in free air thermometers because the amount of radiation received is extremely low and great collecting efficiency in a radiometer is, therefore, vital, otherwise there will be insufficient signal to override the unavoidable noise which is present in all electro-optical systems.

In the radiometer of the present invention a relatively very small opening is deliberately used. This opening may be entirely open, or may be covered with a window. Even if a window is used, it is so small and in such good conductive relation at its edges with the radiometer that for all practical purposes it remains at radiometer temperature. The optics used involve a converging mirror imaging an enormous field of view onto a small detector. The design of the catoptric optics will be described below, but at this point it should be noted that the maximum physical dimension of the collecting mirror, which is represented by a chord, is more than 10 times, and preferably from 50 to 100 times as large as the tiny opening. Thus, while the radiometer violates all canons of effective radiometer design and would normally be considered completely useless for measuring low intensity radiations, the collection from the enormous field of view permits sensitivities which compare very favorably with conventional radiometers which normally receive radiation from much smaller targets.

Considering again as an illustration a free-air thermometer, the optics provide a field of view 60° or more in a horizontal extent and a lesser, but still by ordinary sensitive radiometer standards large field of view in the vertical direction. This may, for example, be 10°. The reason for the lesser extent in the vertical direction is that air temperatures do change somewhat with altitude but horizontally an enormous angle can be used and still maintain high accuracy of temperature measurement. In the case of large extended targets, for example, the surface of the water in a sea water radiometer, there may not be the restriction on one direction of the field of view and in such cases the field of view can be made still larger.

The relatively small opening in the radiometer, whether left open or covered with a window, presents completely negligible heat exchange with the inside of the radiometer. As a result, temperature gradients are not set up and thermostatic control of radiometer temperature presents no problem. This facet of the present invention is particularly important when the reference source of radiation is a portion of the radiometer itself, such as the blackened back of a chopper blade. This is not to say that the present invention cannot be used with a radiometer in which there is a separate reference source the temperature of which is thermostatically controlled. However, the improvement which the present invention makes possible is not as spectacular as with the type of radiometer where the temperature of the whole instrument must be thermostatically controlled.

The converging mirror or mirrors which image the wide field of view onto a small detector preferably produce a 1:1 magnification so that the tiny entrance hole is the same size as the detector. This gives maximum energy for a given hole size, and thus permits minimum heat exchange of the outside with the inside of the radiometer. The most convenient form of such optics is a spherical mirror in which the detector and the tiny opening to the outside are both located substantially at the center of curvature of the mirror. With this arrangement spherical aberration is eliminated. Other mirror imaging systems which permit similar magnification include elliptical mirrors with the detector at one focus and the tiny opening at the other. However, the spherical mirror is so much cheaper that it is preferred.

The above discussion has dealt with a radiometer which is hotter than the ambient air temperature as in free air thermometers where the local high temperature of surfaces of a supersonic airplane present problems is the most common situation and brings out the advantages of the present invention to a very marked degree. The invention, however, is not limited to a radiometer which is maintained at a thermostatically controlled temperature above ambient. The control may be by cooling to maintain a temperature significantly below a fluctuating ambient temperature. The prevention of heat exchange with the outside environment which is assured by the relatively tiny opening, and which is one of the important principles of the present invention, is equally applicable to cooled radiometers thermostatically maintained at a lower temperature.

The invention will be described in greater detail in conjunction with the drawings in which.

Figure 1:
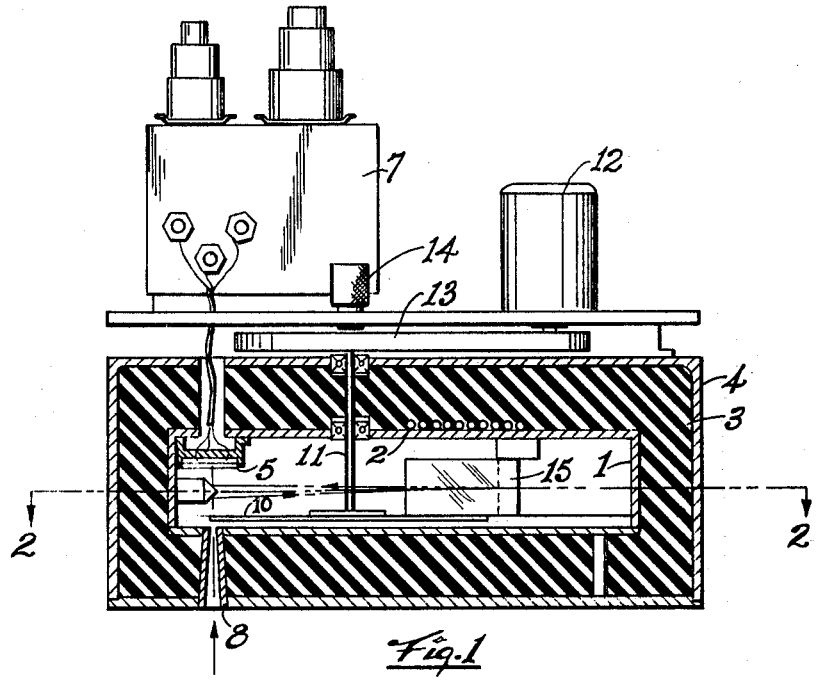
FIG. 1 is a vertical cross-section.

The radiometer (for a temperature above ambient) comprises a container 1 provided with heating wires 2 which are controlled by a conventional thermostat (not shown). Heavy insulation 3 surrounds the radiometer which is contained in an outer casing 4. A detector 5 made suitably selective by the use of filters or other means, is mounted adjacent a triangular double mirror 9. A very small opening 8 is provided in the radiometer and extends through the insulation and the outer casing. Incoming radiation strikes one side of the double mirror 9 and is reflected to a concave spherical mirror 15. The converging beam from the spherical mirror strikes the other side of the double mirror 9 and images the tiny opening 8 onto the detector 5. It will be noted that both detector and tiny opening are substantially at the radius of curvature of the mirror 15. This produces a 1:1 image of the opening 8 onto the detector.

A chopper 10 is interposed in the incoming beam with blackened rear blade surfaces. It is driven by shaft 11, an outer pulley (which does not show), which in turn is driven by a belt 13 from a motor 12. The outer pulley is provided with a magnetic insert which actuates a synchronous pickup 14 of conventional design. Detector output passes through a cable 6 into a conventional preamplifier 7.

As the electronic circuits are not changed by the present invention, and so form no part thereof, only the elements which are physically associated with the radiometer itself are shown. The electronic circuits, as is conventional, provide amplification and synchronous rectification actuated from the synchronous pickup to produce an output signal which is a function of radiation received by the detector. The electronic circuits are interchangeable in any radiometer and it is an advantage of the present invention that standard radiometer electronics may be used.

It will be seen in FIG. 1 that the smallest part of the opening 8 is approximately $\frac{1}{60}$ of the chord of the mirror 15, that is to say, it is in the field of preferred proportions set out above.

Figure 2:
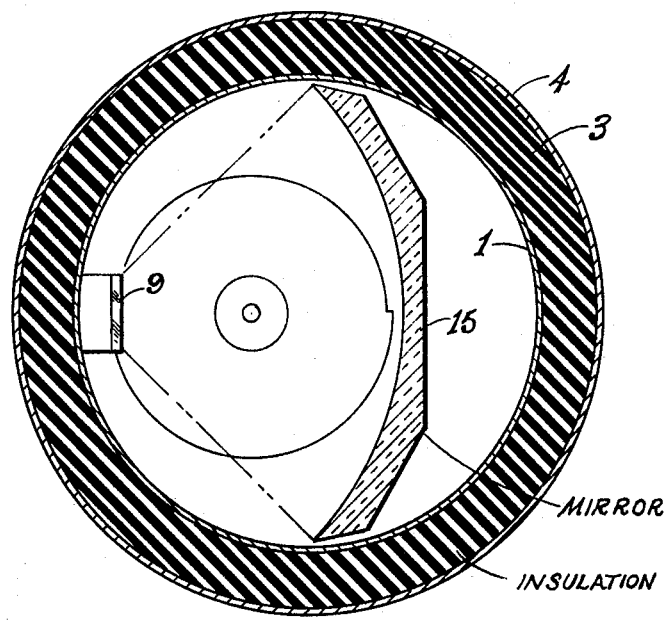
FIG. 2 is a horizontal section along the line 2—2 of FIG. 1.

FIGS. 1 and 2 show that the mirror 15 is not circular, but receives energy from a much larger field of view in the horizontal direction than in the vertical direction. These fields are determined by the angles at the opening 8 subtended by the dimensions of the mirror. When an extended target is to be observed which does not have temperature gradients in either direction the mirror can, of course, be symmetrical in its field of view with still further increased energy pickup.

The drawings show a round radiometer which permits maximum compactness; however, the shape of the radiometer is entirely immaterial and the present invention thus has a desirable flexibility in that it can be adapted to instruments of any shape for any particular kind of mounting.

I claim:

1. A radiometer comprising, in combination,
    (a) a thermally insulated radiometer housing,
    (b) a radiation detector,
    (c) catoptric imaging means and a relatively minute opening in the housing, the maximum dimension of the catoptric means being more than 10 times the diameter of the opening and the imaging means imaging the minute opening onto the radiation detector,
    (d) means for chopping the incoming radiation whereby chopped radiation from a very large angular field of view is imaged onto the detector.

2. A radiometer according to claim 1 in which the maximum dimension of the catoptric imaging means is from 50 to 100 times the diameter of the relatively minute opening in the housing.

3. A radiometer according to claim 2 comprising means for controlling thermostatically the temperature of the whole of the insulated radiometer housing.

4. A radiometer according to claim 2 adapted for free air thermometry in which the maximum dimension of the catoptric imaging means is in a horizontal plane and the dimension of the imaging means in a vertical plane is much smaller.

5. A radiometer according to claim 1 comprising means for controlling thermostatically the temperature of the whole of the insulated radiometer housing.

6. A radiometer according to claim 5 in which the rear surface of the chopping means constitutes a radiometer reference surface.

7. A radiometer according to claim 1 adapted for free air thermometry in which the maximum dimension of the catoptric imaging means is in a horizontal plane and the dimension of the imaging means in a vertical plane is much smaller.

8. A radiometer according to claim 1 in which the rear surface of the chopping means constitutes a radiometer reference source.

9. A radiometer according to claim 1 in which the catoptric imaging means is a spherical mirror and the detector and opening are located at the center of curvature of the mirror.

10. A radiometer according to claim 9 in which the detector and the small opening are in line and half way between them there is located a double mirror one side positioned to reflect radiation coming in through the opening onto the spherical mirror and the other to reflect radiation converged by the spherical mirror onto the detector whereby, although both detector and opening are at the center of curvature of the spherical mirror, they do not obstruct each other.

11. A radiometer according to claim 10 in which the maximum dimension of the spherical mirror is from 50 to 100 times the diameter of the relatively minute opening in the housing.

References Cited by the Examiner
UNITED STATES PATENTS

| | | | |
|---|---|---|---|
| 2,199,082 | 4/1940 | Peters | 73—355 |
| 2,909,924 | 3/1959 | Flook, et al. | 73—355 |
| 3,097,300 | 7/1963 | Wormser et al. | 250—83.3 |
| 3,222,522 | 12/1965 | Birkbak | 250—83.3 |

LOUIS R. PRINCE, *Primary Examiner.*